(12) United States Patent
Maranville

(10) Patent No.: US 7,137,269 B1
(45) Date of Patent: Nov. 21, 2006

(54) MISTING SYSTEM

(76) Inventor: Jeffrey S. Maranville, 15285 Dauchy Ave., Riverside, CA (US) 92508

( * ) Notice: Subject to any disclaimer, the term of this patent is extended or adjusted under 35 U.S.C. 154(b) by 0 days.

(21) Appl. No.: 10/934,965

(22) Filed: Sep. 7, 2004

(51) Int. Cl.
  *B01F 3/04* (2006.01)
(52) U.S. Cl. .......................... 62/306; 62/314
(58) Field of Classification Search ............. 62/304, 62/306, 310, 314
  See application file for complete search history.

(56) References Cited

U.S. PATENT DOCUMENTS

| | | | |
|---|---|---|---|
| 5,441,202 A | | 8/1995 | Winterling et al. |
| 5,598,719 A | | 2/1997 | Jones et al. |
| 5,651,502 A | * | 7/1997 | Edwards ............. 239/450 |
| 6,112,538 A | * | 9/2000 | Strussion ............. 62/304 |
| D433,112 S | | 10/2000 | Louis, Jr. |
| 6,189,805 B1 | | 2/2001 | West et al. |
| 6,264,120 B1 | | 7/2001 | Winterling et al. |
| 6,371,388 B1 | | 4/2002 | Utter et al. |
| 6,393,857 B1 | | 5/2002 | Malueg |

* cited by examiner

*Primary Examiner*—Melvin Jones

(57) ABSTRACT

The present invention comprises a misting system for dispenses a fluid in the form of a mist to facilitate evaporative cooling of a localized area. The misting system comprises a pressurizable fluid container with a fluid control valve, and a first end of a hose member attached to the fluid control valve. A pump selectively pressurizes the container. A plurality of nozzle members is fluidly coupled together by a plurality of conduits. A first connector fluidly couples one of the conduits to a second end of the hose member. Actuating the pump pressurizes the container, forcing fluid within the container to flow out through the fluid control valve, through the hose member, into the conduits, and out of the nozzle members to produce a fine mist to facilitate the cooling of the localized area.

13 Claims, 5 Drawing Sheets

MISTING SYSTEM

BACKGROUND OF THE INVENTION

1. Field of the Invention

The present invention relates to misting devices and more particularly pertains to a new misting device for the facilitation of evaporative cooling of a localized area.

2. Description of the Prior Art

The use of misting devices is known in the prior art. U.S. Pat. No. 6,264,120 describes a portable automated misting device for automatically dispersing a mist for the cooling of a small area such as that for a single person. Another type of misting device is U.S. Pat. No. 6,371,388 having a fan propelled misting apparatus requiring power to be applied continuously. Another type of misting device is U.S. Pat. No. 6,189,805 which utilizes a pressurizing device which keeps a fluid tank pressurized by means of the use of a compressor requiring continuous power to operate. U.S. Pat. No. 6,393,857 describes a cooing apparatus configured for and integrally designed into a golf cart to keep the occupants cool.

While these device fulfill their respective, particular objectives and requirements, the need remains for a system that is capable of covering a large area so that an entire group of people is cooled, while still remaining highly portable.

SUMMARY OF THE INVENTION

The present invention generally comprises a misting system that selectively dispenses a fluid in the form of a mist for the facilitation of evaporative cooling of a localized area. The misting system comprises a pressurizable fluid container that has a fluid control valve fluidly coupled thereto for variably releasing fluid from the container. A pump selectively pressurizes the container and is selectively fluidly couplable to the container. A hose member has a first end that is fluidly attached to the fluid control valve. A plurality of nozzle members disperses the fluid about the localized area. Each of the nozzle members has a coupling portion and a dispensing portion. A plurality of conduits fluidly couples each of the nozzle members together. A first connector is fluidly coupled to one of the conduits, and is designed for selectively coupling an associated conduit to a second end of the hose member. Actuating the pump forces air into the container, which in turn forces fluid within the container to flow out through the fluid control valve and into the hose. The fluid flows through the hose member, into the conduits, and out of the nozzle members to produce a fine mist to facilitate the evaporative cooling of the localized area.

There has thus been outlined, rather broadly, the most important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
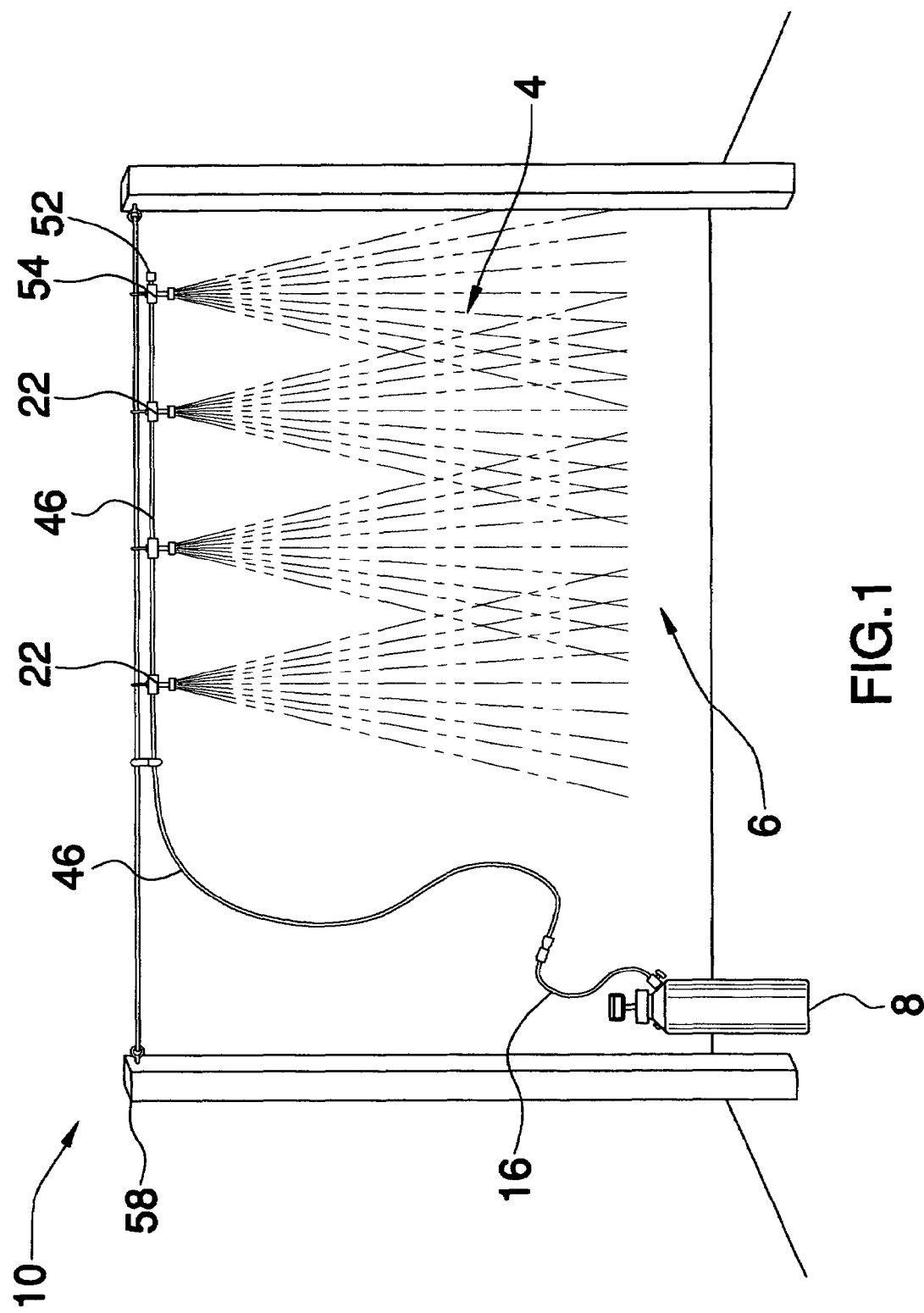
FIG. 1 is a view of a misting system according to the present invention attached to a support assembly.

With reference now to the drawings, and in particular to FIGS. 1 through 5 thereof, a new misting device embodying the principles and concepts of the present invention and generally designated by the reference numeral 10 will be described.

As best illustrated in FIGS. 1 through 5, the misting system 10 selectively dispenses a fluid 2 in the form of a mist 4 for the facilitation of evaporative cooling of a localized area 6.

The misting system 10 comprises a pressurizable fluid container 8 being of a conventional design such as those used for the manual application of residential lawn fertilizers or the like. The container 8 has a pressure release valve 11 fluidly coupled thereto for selectively relieving pressure from the container 8. The container 8 has a fluid control valve 12 fluidly coupled thereto for variably releasing fluid 2 from the container 8.

Figure 2:
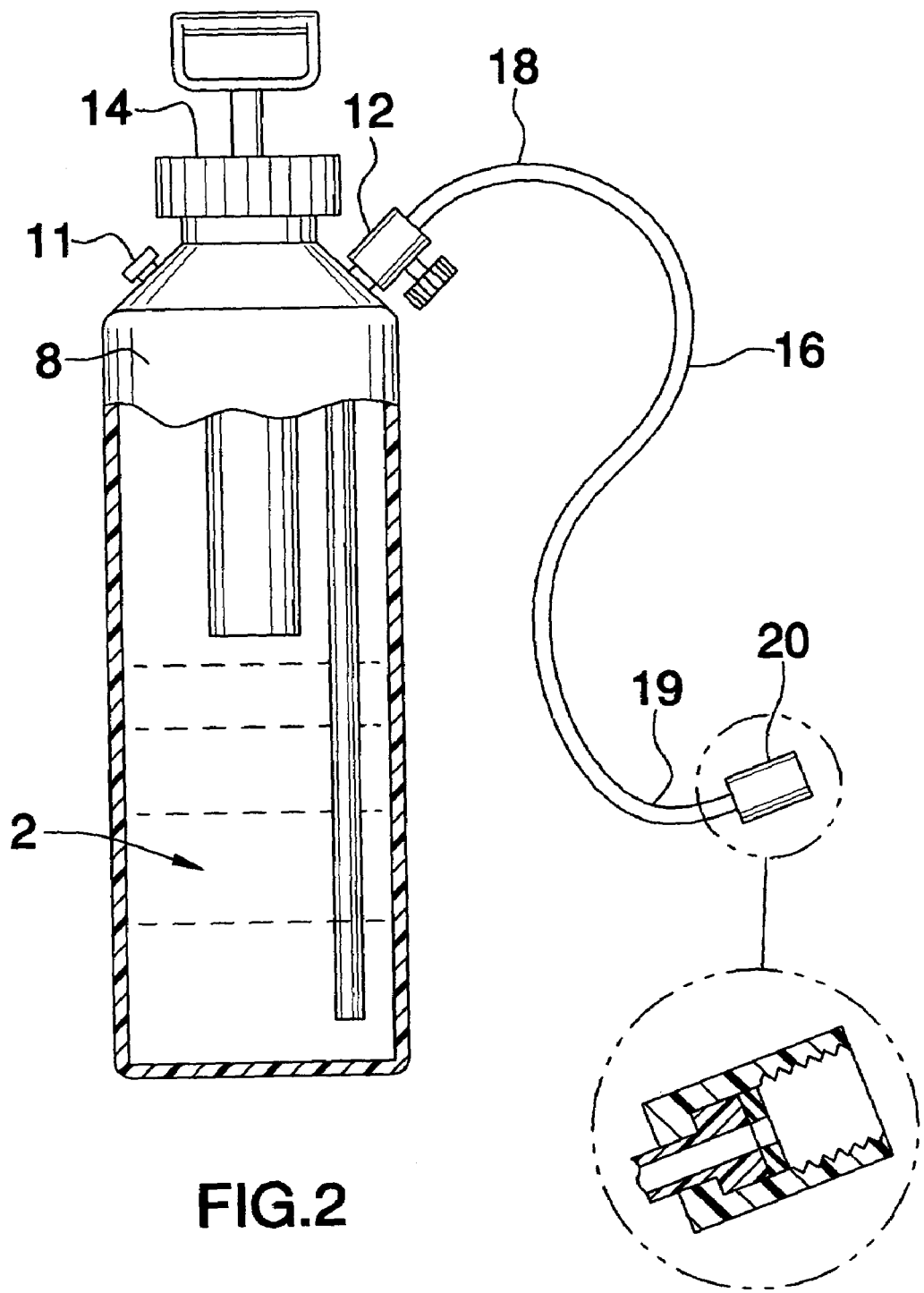
FIG. 2 is a partial cross-sectional view of the pump with the hose attached of the present invention.
Figure 3:
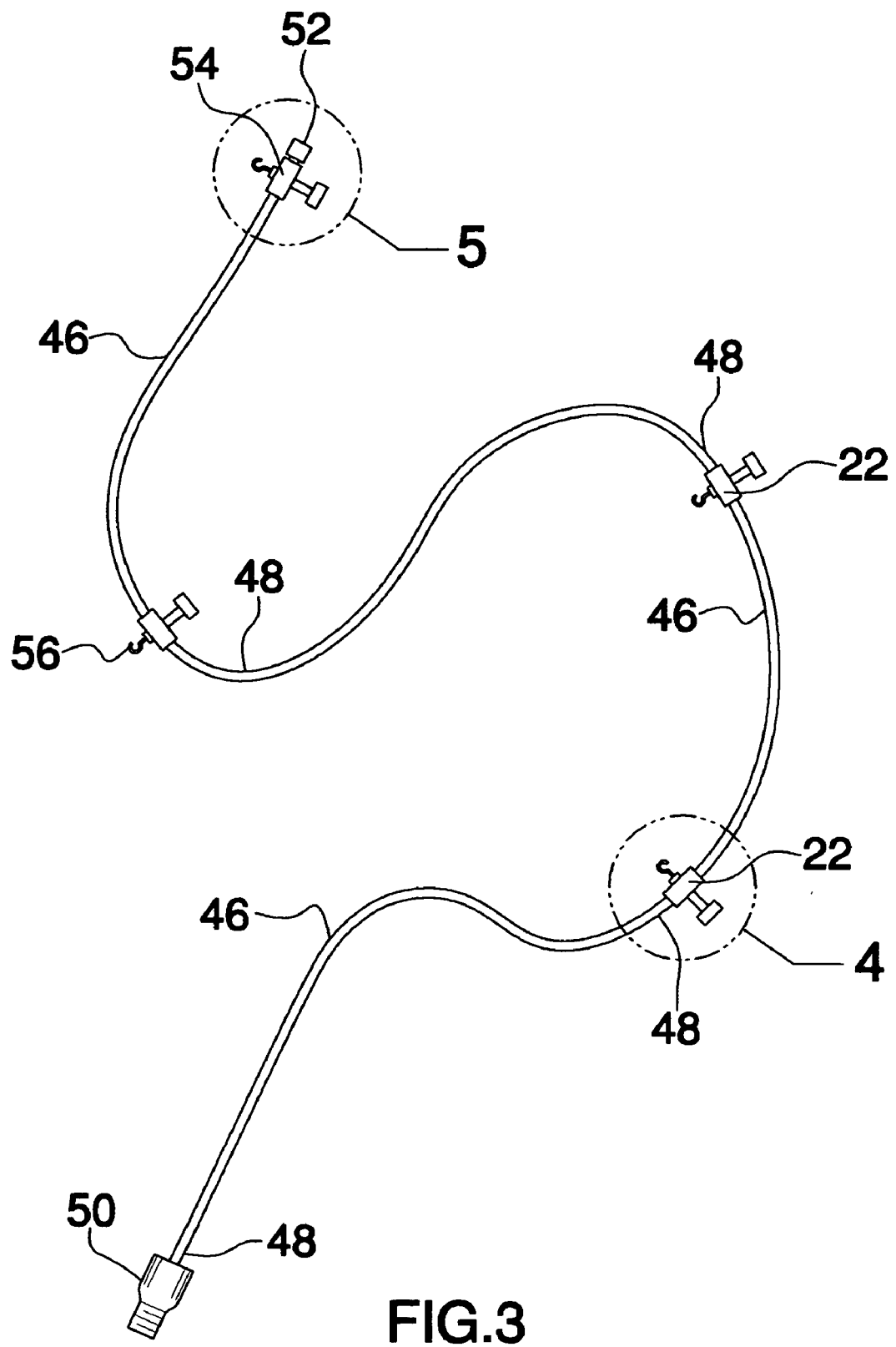
FIG. 3 is a view of nozzle members attached in series to conduits.
Figure 4:
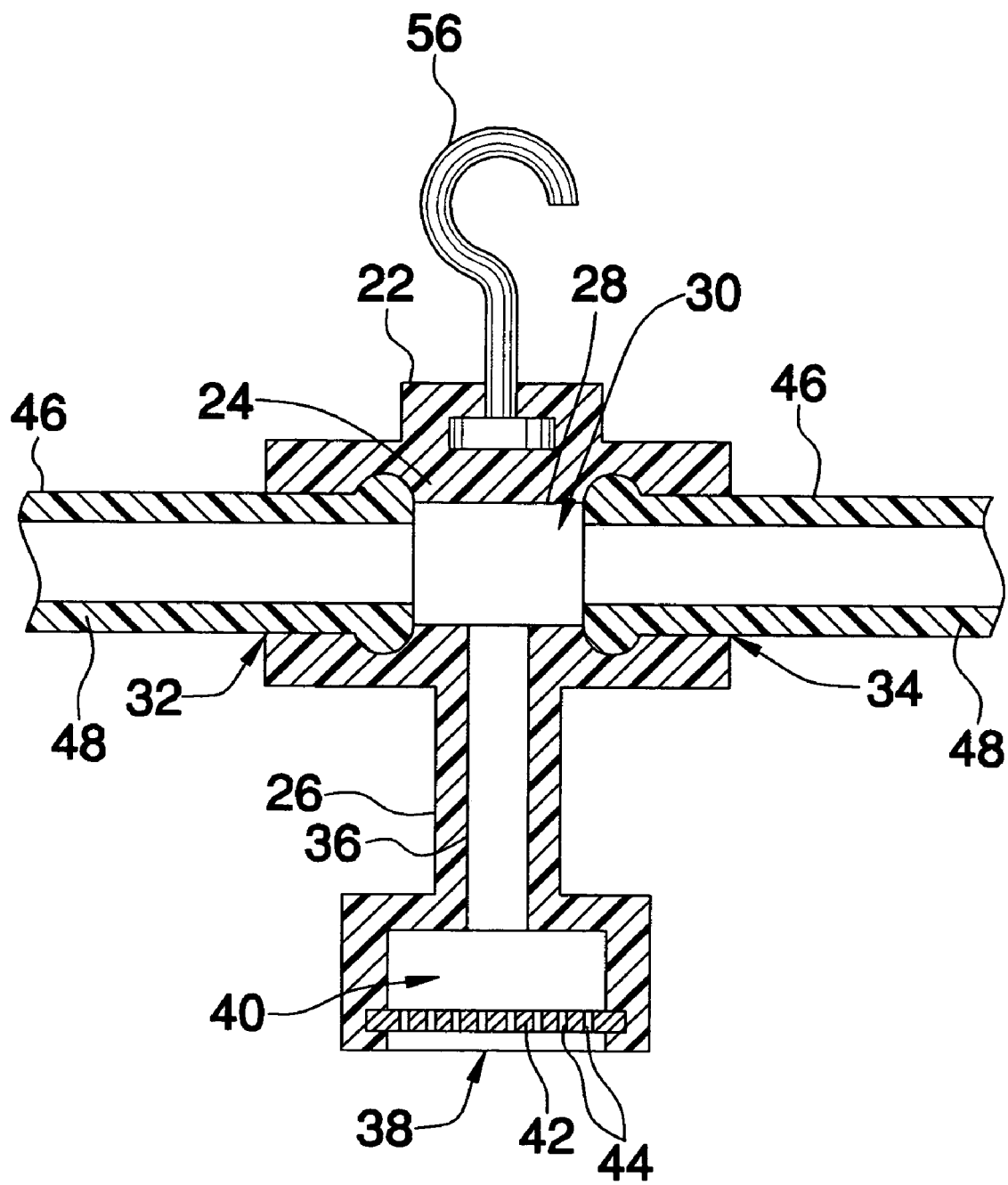
FIG. 4 is a cross-sectional view of a nozzle member with conduits attached for in-series coupling of the present invention.
Figure 5:
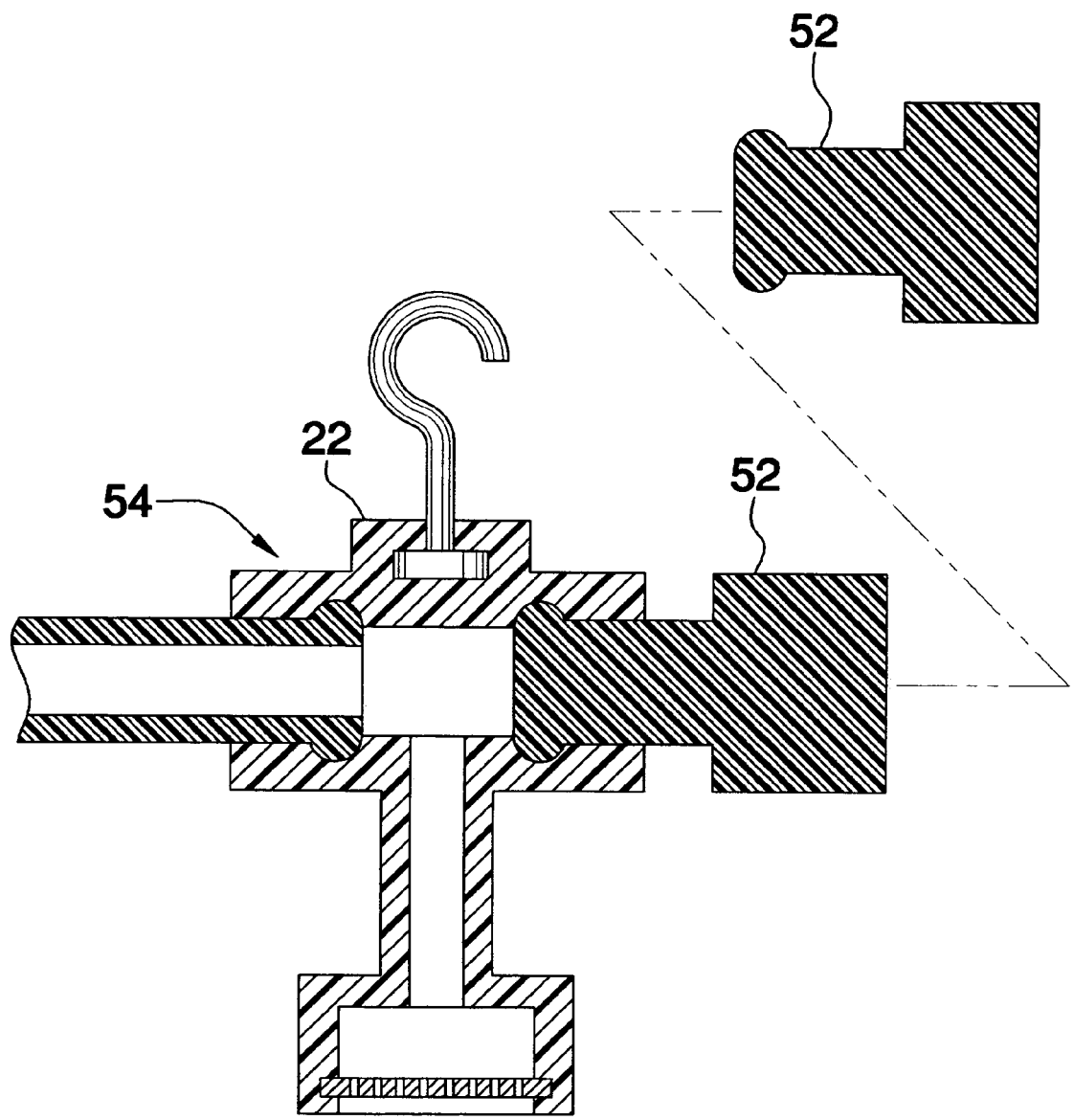
FIG. 5 is a cross-sectional view of a nozzle member with a conduit and a plug attached to and sealing off the last nozzle member.

A pump 14 selectively pressurizes the container 8 and is selectively fluidly couplable to the container 8. The pump 14 may be removed for filling the container 8 with a fluid 2, which is preferably water. In the preferred embodiment, as illustrated in FIGS. 1 and 2, depicted is a manual pump actuated by hand to pressurize the container. However, those skilled in the art will realize that any type of pump may be utilized, though a hand pump is preferred to ensure that the system 10 remains readily portable.

A hose member 16 has a first end 18 that is fluidly attached to the fluid control valve 12. A second end 19 of the hose member 16 has a first connector 20 integrally attached thereto.

Actuating the pump 14 forces air into the container 8 which in turn forces fluid 2 within the container 8 to flow outward of the fluid control valve 12 and into the hose member 16.

Included is a plurality of nozzle members 22 for dispersing the fluid 2 to the localized area 6. Each of the nozzle members 22 has a coupling portion 24 and a dispensing portion 26. The coupling portion 24 comprises a first tube 28 with a bore 30 that extends therethrough such that a first opening 32 and a second opening 34 are defined. The dispensing portion 26 comprises a second tube 36 that is coupled to and is orientated perpendicular to the first tube 28. The second tube 36 has a free end 38 with a hole 40 that extends therein and into the first tube 28 such that the first tube 28 is fluidly coupled to the second tube 36. A screen 42 is mounted in the hole 40 and is positioned adjacent to the free end 38. The screen 42 has a plurality of apertures 44 that extend therethrough for the facilitation of the atomization of the fluid 2 when the fluid 2 passes through the screen 42 under pressure.

A plurality of conduits 46 fluidly couples each of the nozzle members 22 together. Terminal ends 48 of each of the conduits 46 are selectively extended into one of the first 32 and second 34 openings such that each of the conduits 46 is fluidly coupled to one of the coupling portions 24. A second connector 50 is fluidly coupled to one of the terminal ends 48 and is designed for selectively coupling to the first connector 20 so that the conduits are fluidly coupled to the second end 19 of the hose member 16.

A plug member 52 that has a size and shape designed for removably positioning in and sealing one of the first 32 and/or second 34 openings of the first tubes 28 is removably extendable into to a last one of a plurality of the nozzle members 54 that are fluidly coupled together in series.

Each of a plurality of hook members 56 is attached to one of the nozzle members 22. Each of the hook members 56 is selectively attachable to a support assembly 58. The support assembly 58 can comprise of any structure to which the nozzle members 22 are attachable such as the framework as shown in FIG. 1. However, it should be noted that the hooks might also be attached to an overhang, tree branches, or any other elevated structure, which is positioned adjacent to, and preferably above, an area to be cooled.

In use, the hook members 56 are attached to the support assembly 58, or another elevated structure, so that the nozzle members 22 are supported above the localized area 6 to be cooled. Fluid 2 flows through the hose member 16 and enters the plurality of conduits 46 and flows outwardly of the nozzle members 22. The fluid 2 is forced through the screen 42 to produce a fine mist 4. The mist 4 evaporates around the localized area 6 to produce a cooling affect. After use, the system 10 may be disassembled and easily transported or stored until its next use.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A misting system for selectively dispensing a fluid in the form of a mist for the facilitation of evaporative cooling of a localized area, said misting system comprising:
   a pressurizable fluid container having a fluid control valve fluidly coupled thereto for variably releasing fluid from said container, a pressure release valve being fluidly coupled to said container for selectively relieving pressure from said container;
   a pump for selectively pressurizing said container being selectively fluidly coupled to said container;
   a hose member having a first end being fluidly attached to said fluid control valve;
   a plurality of nozzle members for dispersing the fluid to the localized area, each of said nozzle members having a coupling portion and a dispensing portion;
   a plurality of conduits for fluidly coupling each of said nozzle members together;
   a first connector being fluidly coupled to one of said conduits, said first connector being adapted for selectively coupling an associated conduit to a second end of said hose member; and
   wherein actuating said pump forces air into said container which in turn forces fluid within said container to flow outward of said fluid control valve and into said hose member such that fluid flowing through said hose member enters said plurality of conduits and flows outwardly of said nozzle members.

2. The misting system according to claim 1, wherein said coupling portion comprises a first tube having a bore extending therethrough such that a first opening and a second opening are defined, each of said conduits having a pair of terminal ends, each of said terminal ends being selectively extendable into one of said first and second openings such that said nozzle members are fluidly coupled together in series.

3. The misting system according to claim 2, wherein said dispensing portion further includes a second tube being coupled to and being orientated perpendicular to said first tube, said second tube having a free end having a hole extending therein and into said first tube such that said first tube is fluidly coupled to said second tube.

4. The misting system according to claim 3, further including a screen being mounted in said hole and being positioned adjacent to said free end, wherein said screen having a plurality of apertures extending therethrough for the facilitation of the atomization of the fluid when the fluid passes through the screen under pressure.

5. The misting system according to claim 2, further including a plug member, said plug member having a size and shape adapted for removably positioning in and sealing one of said openings of said first tubes, wherein said plug member is removably extendable into to a last one of a plurality of said nozzle members fluidly coupled together in series.

6. The misting system according to claim 1, further including a plurality of book members, each of said hook members being attached to one of said nozzle members, wherein each of said hook members being selectively attachable to a support assembly.

7. A misting system for selectively dispensing a fluid in the form of a mist for the facilitation of evaporative cooling of a localized area, said misting system comprising:
   a pressurizable fluid container, said container having a pressure release valve fluidly coupled thereto for selectively relieving pressure from said container, said container having a fluid control valve fluidly coupled thereto for variably releasing fluid from said container;
   a pump for selectively pressurizing said container being selectively fluidly coupled to said container;
   a hose member having a first end being fluidly attached to said fluid control valve, a second end of said hose member having a first connector integrally attached thereto;
   wherein actuating said pump forces air into said container which in turn forces fluid within said container to flow outward of said fluid control valve and into said hose member;
   a plurality of nozzle members for dispersing the fluid to the localized area, each of said nozzle members having a coupling portion and a dispensing portion, said coupling portion comprising a first tube having a bore extending therethrough such that a first opening and a second opening are defined, said dispensing portion comprising a second tube being coupled to and being orientated perpendicular to said first tube, said second tube having a free end having a hole extending therein and into said first tube such that said first tube is fluidly coupled to said second tube, a screen being mounted in said hole and being positioned adjacent to said free end, said screen having a plurality of apertures extending therethrough for the facilitation of the atomization of the fluid when the fluid passes through the screen under pressure;

a plurality of conduits for fluidly coupling each of said nozzle members together, terminal ends of each of said conduits being selectively extendable into one of said first and second openings such that each of said conduits are fluidly coupled to one of said coupling portions, a second connector being fluidly coupled to one of said terminal ends, said second connector being adapted for selectively coupling an associated one of said tubular members to said second end of said hose member;

a plug member having a size and shape adapted for removably positioning in and sealing one of said openings of said first tubes, said plug member being removably extendable into to a last one of a plurality of said nozzle members fluidly coupled together in series;

a plurality of hook members, each of said hook members being attached to one of said nozzle members, each of said hooks being selectively attachable to a support assembly; and wherein fluid flowing through said hose member enters said plurality of conduits and flows outwardly of said nozzle members.

8. A misting system for selectively dispensing a fluid in the form of a mist for the facilitation of evaporative cooling of a localized area, said misting system comprising:

a pressurizable fluid container having a fluid control valve fluidly coupled thereto for variably releasing fluid from said container;

a pump for selectively pressurizing said container being selectively fluidly coupled to said container;

a hose member having a first end being fluidly attached to said fluid control valve;

a plurality of nozzle members for dispersing the fluid to the localized area, each of said nozzle members having a coupling portion and a dispensing portion;

a plurality of conduits for fluidly coupling each of said nozzle members together;

a first connector being fluidly coupled to one of said conduits, said first connector being adapted for selectively coupling an associated conduit to a second end of said hose member;

a plurality of hook members, each of said hook members being attached to one of said nozzle members, wherein each of said hook members being selectively attachable to a support assembly; and wherein actuating said pump forces air into said container which in turn forces fluid within said container to flow outward of said fluid control valve and into said host member such that fluid flowing through said hose member enters said plurality of conduits and flows outwardly of said nozzle members.

9. The misting system according to claim 8, further including a pressure release valve being fluidly coupled to said container for selectively relieving pressure from said container.

10. The misting system according to claim 8, wherein said coupling portion comprises a first tube having a bore extending therethrough such that a first opening and a second opening are defined, each of said conduits having a pair of terminal ends, each of said terminal ends being selectively extendable into one of said first and second openings such that said nozzle members are fluidly coupled together in series.

11. The misting system according to claim 10, wherein said dispensing portion further includes a second tube being coupled to and being orientated perpendicular to said first tube, said second tube having a free end having a hole extending therein and into said first tube such that said first tube is fluidly coupled to said second tube.

12. The misting system according to claim 11, further including a screen being mounted in said hole and being positioned adjacent to said free end, wherein said screen having a plurality of apertures extending therethrough for the facilitation of the atomization of the fluid when the fluid passes through the screen under pressure.

13. The misting system according to claim 10, further including a plug member, said plug member having a size and shape adapted for removably positioning in and sealing one of said openings of said first tubes, wherein said plug member is removably extendable into a last one of a plurality of said nozzle members fluidly coupled together in series.

* * * * *